(12) United States Patent
Galmiche

(10) Patent No.: US 11,784,547 B2
(45) Date of Patent: Oct. 10, 2023

(54) ROTOR FOR A SQUIRREL-CAGE ASYNCHRONOUS ROTATING ELECTRIC MACHINE AND ASSOCIATED ROTATING MACHINE

(71) Applicant: GE Energy Power Conversion Technology Limited, Warwickshire (GB)

(72) Inventor: Christophe Galmiche, Toul (FR)

(73) Assignee: GE Energy Power Conversion Technology Limited, Warwickshire (GB)

( * ) Notice: Subject to any disclaimer, the term of this patent is extended or adjusted under 35 U.S.C. 154(b) by 199 days.

(21) Appl. No.: 17/413,932

(22) PCT Filed: Dec. 12, 2019

(86) PCT No.: PCT/EP2019/084857
§ 371 (c)(1),
(2) Date: Jun. 14, 2021

(87) PCT Pub. No.: WO2020/120662
PCT Pub. Date: Jun. 18, 2020

(65) Prior Publication Data
US 2022/0085705 A1    Mar. 17, 2022

(30) Foreign Application Priority Data
Dec. 14, 2018   (FR) ..................... 1872970

(51) Int. Cl.
*H02K 17/00*   (2006.01)
*H02K 15/00*   (2006.01)
*H02K 17/16*   (2006.01)

(52) U.S. Cl.
CPC ....... *H02K 17/165* (2013.01); *H02K 15/0012* (2013.01)

(58) Field of Classification Search
CPC .................. H02K 17/165; H02K 15/0012
See application file for complete search history.

(56) References Cited

U.S. PATENT DOCUMENTS 6,441,532 B1    8/2002  Ahrens

FOREIGN PATENT DOCUMENTS

DE    102012110147 A1   4/2014
DE    102012110157 A1 * 6/2014  ............... H02K 1/30
(Continued)

OTHER PUBLICATIONS

DE 102012110157 A1 (Year: 2014).*
(Continued)

*Primary Examiner* — Quyen P Leung
*Assistant Examiner* — Elrasheed E. B. Hamdan
(74) *Attorney, Agent, or Firm* — WOOD IP LLC

(57) ABSTRACT

The rotor with a non-through shaft for a rotary electric machine comprises a cylindrical magnetic body clamped between two half-shafts, each comprising an attachment flange connected to the magnetic body, axial housings being uniformly provided in the magnetic body on at least one diameter of the magnetic body in order to house conductive bars. At least one attachment flange comprises insertion holes, each arranged facing a housing for inserting the conductive bars into the housings and the exterior diameter of the attachment flange is substantially equal to the exterior diameter of the magnetic body, the attachment flange comprising as many insertion holes as housings.

19 Claims, 9 Drawing Sheets

(56) References Cited

FOREIGN PATENT DOCUMENTS

| EP | 1102384 A2 | 5/2001 |
|----|------------|--------|
| JP | S5587180 U | 6/1980 |
| JP | H0236752 A | 2/1990 |
| JP | H0622515 A | 1/1994 |
| JP | H10178755 A | 6/1998 |
| WO | 2010052226 A | 5/2010 |
| WO | 2020120662 A1 | 6/2020 |

OTHER PUBLICATIONS

AT 509042 A2 (Year: 2011).*
International Search Report from International Appl. No. PCT/EP2019/084857, dated Jan. 16, 2020.

* cited by examiner

ROTOR FOR A SQUIRREL-CAGE ASYNCHRONOUS ROTATING ELECTRIC MACHINE AND ASSOCIATED ROTATING MACHINE

FIELD OF INVENTION

The present invention relates to squirrel-cage asynchronous rotating electric machines and relates more particularly to a device for retaining the conductive bars incorporated into a rotor of the machine.

The present invention also relates to a rotating electric machine comprising such a rotor.

BACKGROUND

The conductive bars are housed in housings of a magnetic mass of the rotor and distributed uniformly over at least one diameter of the magnetic mass.

In the document EP0608675, a piercing is carried out from the outer periphery of the magnetic mass to the conductive bar in such a way as to insert a pin or a retaining screw in the piercing to maintain the conductive bar along an axial direction and prevent the bar from rotating on itself and in order for it to be maintained in its housing.

The pin or the retaining screw is preferably inserted at the centre of the length of the bar.

The bar fastened at its centre is free to expand along axial directions on either side of the pin or of the retaining screw.

The torque and the power produced by an asynchronous rotating electric machine depend in particular on the intensity of the induced currents passing through the conductive bars.

However, in order to insert the pin or the retaining screw into the conductive bar, the latter is partially pierced.

Consequently, the cross-section of passage of the induced current is reduced, leading to a reduction in the torque and in the power produced by the squirrel-cage rotating electric machine.

Reference can also be made to the document US2012/0262024 in which a first end of the conductive bars is maintained in a shorting ring by a headless screw inserted into the shorting ring and the end of each bar along an axial direction, the second end of the bars being free to expand.

However, the axial thermal expansion is greater since the bar is not fastened at mid-length but at one of its ends, which leads to friction wear between the free end of the bar and the shorting ring.

Moreover, since the point of fastening of the bar is not located at mid-length of the bar, the axial forces generated by the thermal expansion of the bar are not compensated for, which provokes a concentration of stresses at the fastening point capable of shearing the headless screw or requires a headless fastening screw of a greater size, thus reducing by as much the cross-section of passage of the induced current.

It is thus proposed to overcome the disadvantages of the rotors for a squirrel-cage asynchronous rotating electric machine according to the prior art.

SUMMARY

Given the above, the invention proposes, according to one aspect, a rotor for a squirrel-cage asynchronous rotating electric machine, comprising two compacting elements clamping a cylindrical magnetic mass, shorting discs interposed between the magnetic mass and the compacting elements, and conductive bars housed in housings of the magnetic mass and uniformly distributed over at least one diameter of the magnetic mass so that the shorting discs and the conductive bars form a squirrel cage, at least one of the compacting elements and of the shorting discs comprising insertion holes each disposed facing a housing.

Retaining means are inserted into each insertion hole to retain the conductive bars in the housings.

According to one feature, the insertion hole is blind, the retaining means comprising a flexible element interposed between one end of the conductive bar and the bottom of the blind hole in such a way as to maintain the bar along an axial direction.

Preferably, each insertion through-hole comprises an inner thread, the retaining means comprising a plug and a flexible element, the plug being screwed into the inner thread in such a way as to plug the free end of the compacting element. The flexible element is interposed between one end of the conductive bar and the plug in such a way as to maintain the bar along an axial direction.

According to another feature, the plug comprises a recess in which the flexible element is housed.

Advantageously, each insertion hole further comprises a groove comprising a joint in such a way as to seal the contact between the plug and the compacting element.

According to another feature, the plug comprises a hole so that a cooling fluid flows through the retaining means.

Advantageously, the plug comprises an inner thread receiving a choke calibrating the flow rate of cooling fluid.

In one embodiment, the end of the bar comprises a groove open radially, the insertion hole comprising a guide groove, the retaining means further comprising a retaining element interposed between the end of the bar and the flexible element. The retaining element comprises a heel and a tab, the heel being embedded in the open groove in such a way as to form a shoulder in contact with the end of the bar and the tab sliding in the guide groove in such a way as to prevent the rotation of the bar on itself.

In another embodiment, the end of the bar comprises a flat section, the insertion hole comprising a guide groove, the retaining means further comprising a retaining element interposed between the end of the retaining bar and the flexible element. The retaining element comprises a heel and a tab, the heel comprising a flat section coming in contact with the flat section of the bar in such a way as to form a shoulder in contact with the end of the bar and the tab sliding in the guide groove in such a way as to prevent the rotation of the bar on itself.

According to another feature, the heel or the tab is added onto the retaining element.

Advantageously, the flexible element comprises a spring.

According to another feature, the flexible element comprises at least one Belleville washer.

Advantageously, the end of the bar is hollow and comprises a groove open radially, the insertion hole comprising a guide groove, the flexible element comprising a spring, a first end of the spring being embedded in the open groove and the second end of the spring being embedded in the guide groove in such a way as to prevent the rotation of the bar on itself.

Preferably, the retaining means further comprise an electrically insulating element disposed between the conductive bar and the flexible element.

Advantageously, the compacting element comprises a plate for clamping or a flange for compacting a blind half-shaft.

According to another feature, the magnetic mass comprises compacted magnetic sheets.

Preferably, the magnetic mass comprises a stack of metal plates.

Advantageously, the magnetic mass comprises a one-piece body.

According to another aspect, an asynchronous rotating electric machine comprising a rotor as defined above is proposed.

Other features and advantages of the invention will be clear upon reading the following description of embodiments of the invention, given only as non-limiting examples and in reference to the drawings enclosed herewith.

DETAILED DESCRIPTION

Figure 1:
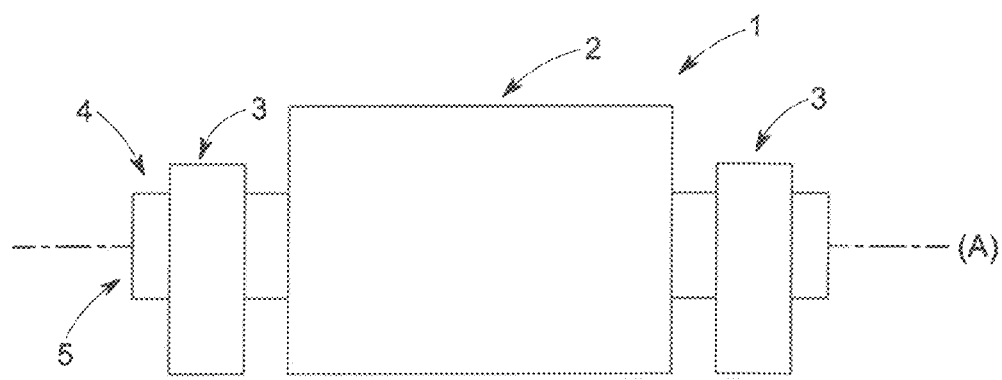
FIG. 1 illustrates an embodiment of a squirrel-cage asynchronous rotating electric machine.

Reference is made to FIG. 1 which illustrates an embodiment of a squirrel-cage asynchronous rotating electric machine 1 comprising a stator 2, bearings 3 and a rotor 4 inserted into the stator 2 and the bearings 3.

The rotor 4 comprises a rotor shaft 5 made for example from steel, the axis (A) of which is the same as the axis of rotation of the rotor 4.

Figure 2:
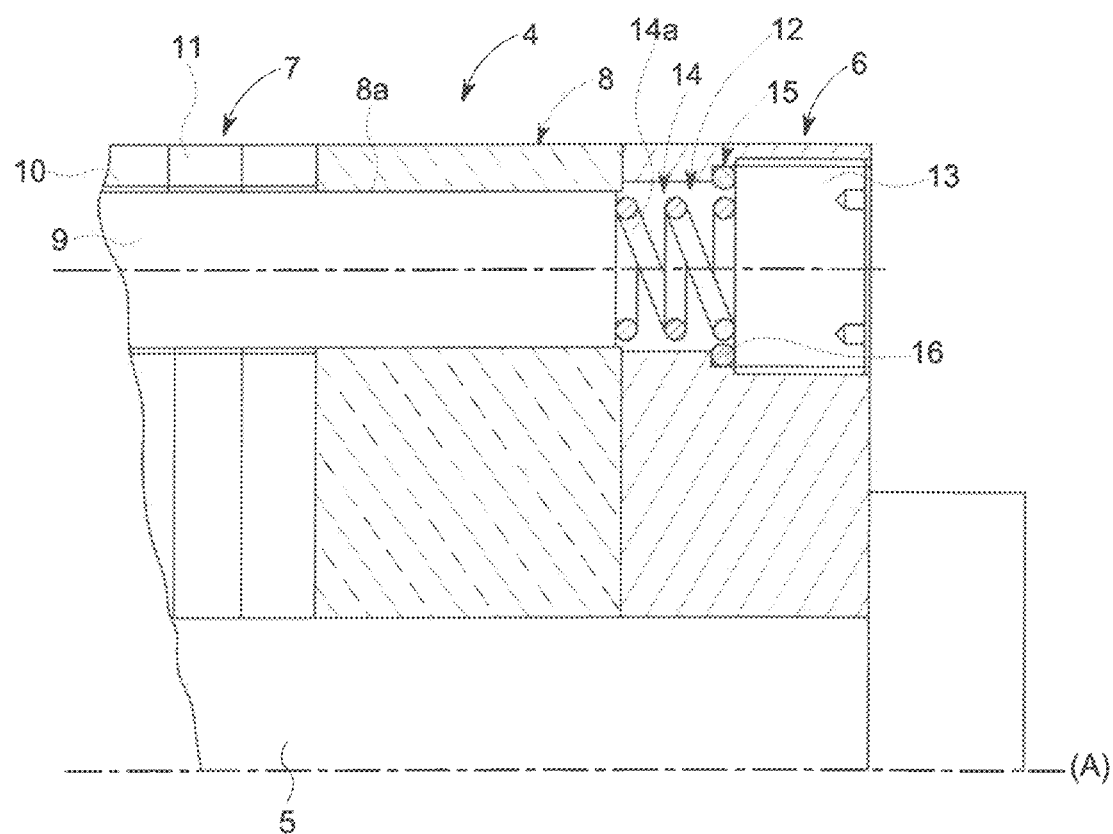
FIG. 2 illustrates a partial cross-section of a first embodiment of the rotor.

Reference is made to FIG. 2 which illustrates a partial cross-section of a first embodiment of the rotor 4 along an axial direction of the rotor.

The rotor 4 comprises two compacting elements comprising clamping plates 6 clamping a cylindrical magnetic mass 7, shorting discs 8 interposed between the magnetic mass 7 and the compacting clamping plates 6, and conductive bars 9 housed in housings 10 of the magnetic mass and uniformly distributed over a diameter of the magnetic mass.

The shorting discs 8 include insertion holes 8a, preferably circular, distributed uniformly over at least one diameter of the shorting discs, and substantially coaxial to the housings 10.

The outer diameter of the clamping plates 6 is substantially equal to the outer diameter of the magnetic mass 7 or of the shorting discs 8.

The housings 10 and the holes 8a are dimensioned to allow the insertion of the conductive bars 9 into the magnetic mass and to compensate for the expansion of the conductive bars 9 under the effect of the heat generated by the passage of the current during its operation and thus prevent a thermo-mechanical imbalance by the free expansion of the conductive bars, in particular along an axial direction of the rotor.

The shorting discs 8 and the conductive bars 9 are made for example from copper and are electrically connected to each other to form a squirrel cage when the rotor is moved by a movement of rotation under the effect of the centrifugal force pushing the conductive bar against the hole 8a of the shorting discs to establish electric contact between the conductive bar and the shorting discs.

The magnetic mass 7 comprises metal plates 11, the thickness of the metal plates preferably being greater than 5% of the outer diameter of the magnetic mass 7.

Alternatively, the magnetic mass 7 can comprise magnetic sheets having a thickness smaller than 2 mm, preferably 0.65 mm or 0.5 mm.

According to yet another alternative, the magnetic mass 7 can comprise a one-piece body made of steel.

At least one clamping plate 6 comprises insertion holes 12 each disposed facing a housing 10 and a hole 8a.

The insertion hole 12 is a through-hole allowing the insertion of the conductive bar into the magnetic mass, and has a partial inner thread.

Retaining means are inserted into each insertion hole 12 of at least one clamping plate 6 to retain the conductive bars 9 in the housings 10.

The retaining means comprise a plug 13 and a flexible element 14, the plug 13 being screwed into the inner thread in such a way as to plug the free end of the clamping plate 6.

The flexible element 14 is interposed between one end of the conductive bar 9 and the plug 13 in such a way as to maintain the bar 9 along an axial direction.

The flexible element comprises a spring 14a.

The flexible element allows to absorb the thermal expansion of the conductive bar 9 along the axial direction, the conductive bar 9 being mounted freely in the housing 10 and in the hole 8a.

Of course, just one or both compacting elements can comprise insertion holes housing the retaining means, the number of insertion holes of each compacting element being equal to the number of conductive bars 9.

The insertion hole 12 further comprises a groove 15 comprising a joint 16 in such a way as to seal the contact between the plug 13 and the clamping plate 6.

The joint 16 limits the deterioration of the conductive bars 9 when the rotor 4 is used in a chemically aggressive environment.

The joint 16 is preferably an O-ring, made of stainless steel, made of polymer or metallic, preferably in one piece without a break or abutting.

Alternatively, the insertion hole does not comprise a groove or a joint.

Figure 3:
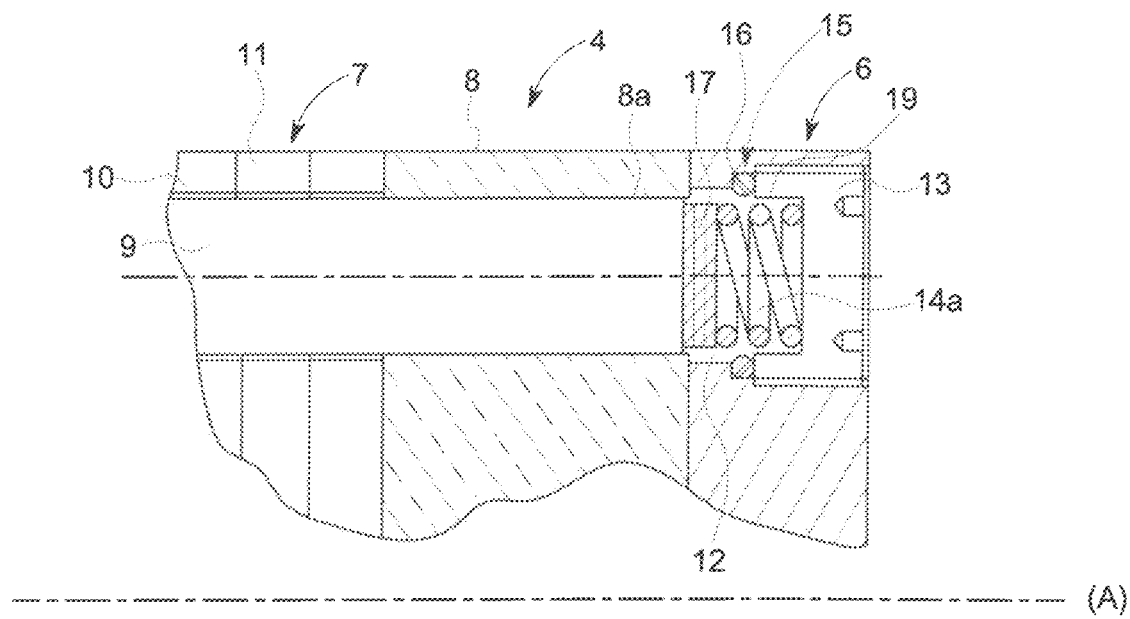
FIG. 3 illustrates a partial cross-section of a second embodiment of the rotor.

FIG. 3 illustrates a partial cross-section of a second embodiment of the rotor 4 along the axial direction.

This embodiment differs from the embodiment illustrated in FIG. 2 in that the retaining means further comprise an insulating element 17 disposed between the conductive bar 9 and the spring 14a.

The insulating element 17 is an electric insulant preventing the circulation of parasite currents in the clamping plate 6 improving the efficiency of the rotating machine 1.

Moreover, the plug 13 comprises a recess 19 in which the spring 14a is housed allowing to shorten the axial length of the retaining means.

Figure 4:
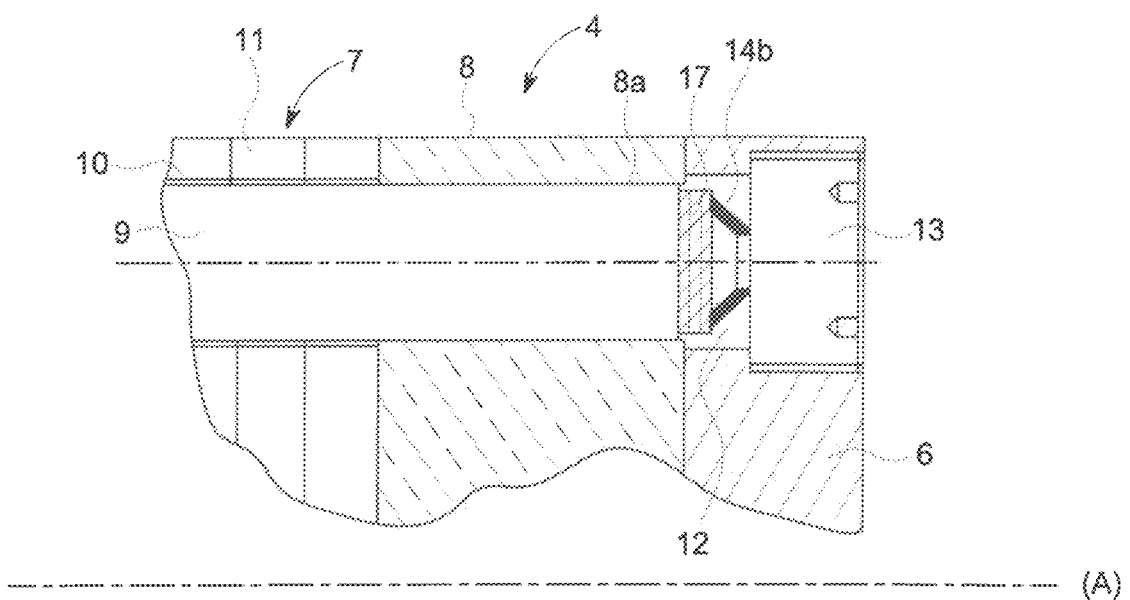
FIG. 4 illustrates a partial cross-section of a third embodiment of the rotor.

FIG. 4 illustrates a partial cross-section of a third embodiment of the rotor 4 along the axial direction.

This embodiment differs from the embodiment illustrated in FIG. 2 in that the insertion hole 12 does not comprise a groove housing a joint, the flexible element 14 comprises a Belleville washer 14b and the insulating element 17 is disposed between the conductive bar 9 and the Belleville washer 14b.

The Belleville washer 14b is particularly adapted when the rotor 4 is subjected to great centrifugal forces (for example from 1000 g to 40000 g), the cross-section of the washer subjected to said forces being reduced with respect to the cross-section of the spring 14a, wherein the turns of the spring 14a are deformed under the effect of said forces.

Alternatively, the flexible element 14 can comprise several Belleville washers 14b mounted in series and/or in parallel.

Figure 5:
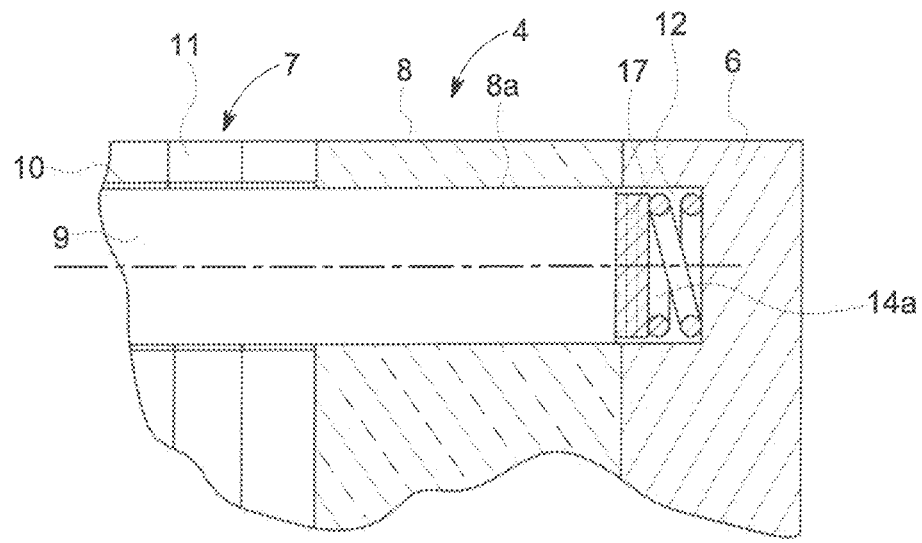
FIG. 5 illustrates a partial cross-section of a fourth embodiment of the rotor.

FIG. 5 illustrates a partial cross-section of a fourth embodiment of the rotor 4 along the axial direction.

This embodiment differs from the embodiment illustrated in FIG. 2 in that the insertion hole 12 is blind and does not comprise a groove housing a joint, the retaining means do not include a plug 13 and the insulating element 17 is disposed between the conductive bar 9 and the spring 14a. The spring 14a is interposed between the end of the conductive bar 9 and the bottom of the blind hole 12 in such a way as to maintain the bar along the axial direction.

Alternatively, the flexible element 14 comprises at least one Belleville washer 14b.

Alternatively, the blind insertion hole 12 can comprise the groove 15 housing the joint 16.

Figure 6:
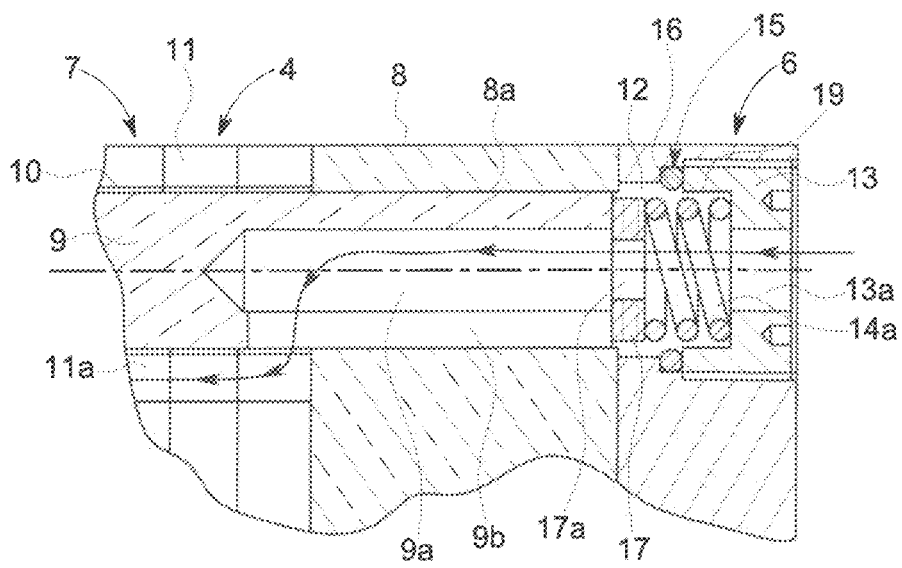
FIG. 6 illustrates a partial cross-section of a fifth embodiment of the rotor.

FIG. 6 illustrates a partial cross-section of a fifth embodiment of the rotor 4 along the axial direction.

This embodiment differs from the embodiment illustrated in FIG. 2 in that the metal plates 11 comprise a recess 11a in such a way as to form a cooling channel located between the conductive bar 9 and the axis (A) of rotation of the rotor. The end of the conductive bar 9 comprises a blind hole 9a oriented along an axial direction and a slot 9b opening the blind hole 9a along an axial direction, the insulating element 17 comprises a hole 17a, and the plug 13 comprises the recess 19 and a through-hole 13a.

The blind hole 9a and the holes 13a and 17a are circular and substantially coaxial so that a cooling fluid flows in the hole 13a, then 17a, then the blind hole 9a, then in the slot 9b to flow into the channel formed by the recess 11a.

The cooling fluid cools the conductive bars 9 of the rotor 4.

The blind hole 9a and the holes 13a and 17a can, however, have any shape.

Figure 7:
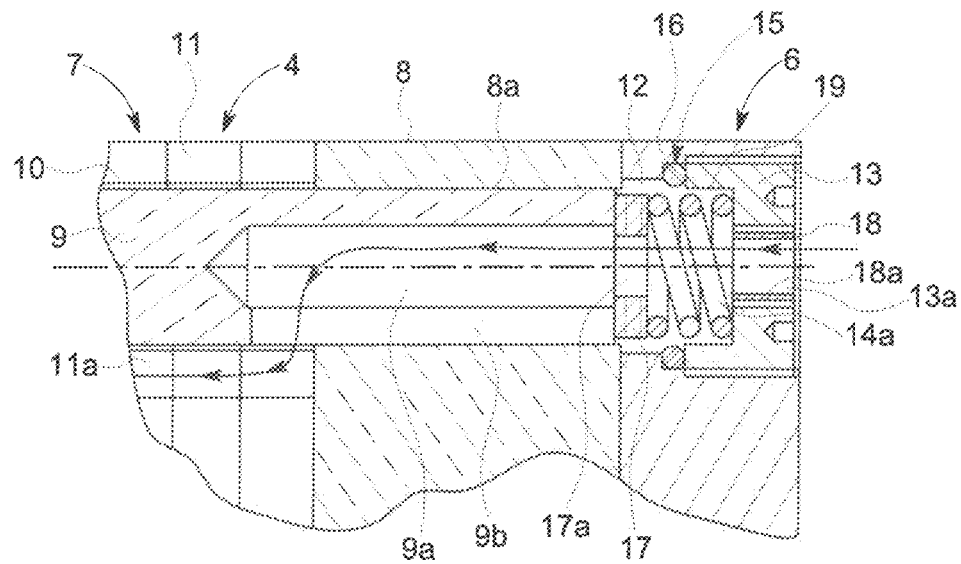
FIG. 7 illustrates a partial cross-section of a sixth embodiment of the rotor.

FIG. 7 illustrates a partial cross-section of a sixth embodiment of the rotor 4 along the axial direction.

This embodiment differs from the embodiment illustrated in FIG. 6 in that the hole 13a comprises an inner thread receiving a choke 18 comprising an orifice 18a in such a way as to regulate and calibrate the flow rate of cooling fluid flowing in the rotor 4.

If the flow rate of the cooling fluid is not consistent with the desired flow rate, it suffices to replace the choke 18 with another choke comprising a larger or smaller orifice according to whether the flow rate of fluid must be increased or decreased.

The embodiments described above maintain the conductive bars 9 along an axial direction.

However, the conductive bars 9 can rotate on themselves.

Below, the retaining means maintain the conductive bars 9 along an axial direction and prevent the bars from rotating on themselves.

Figure 8:
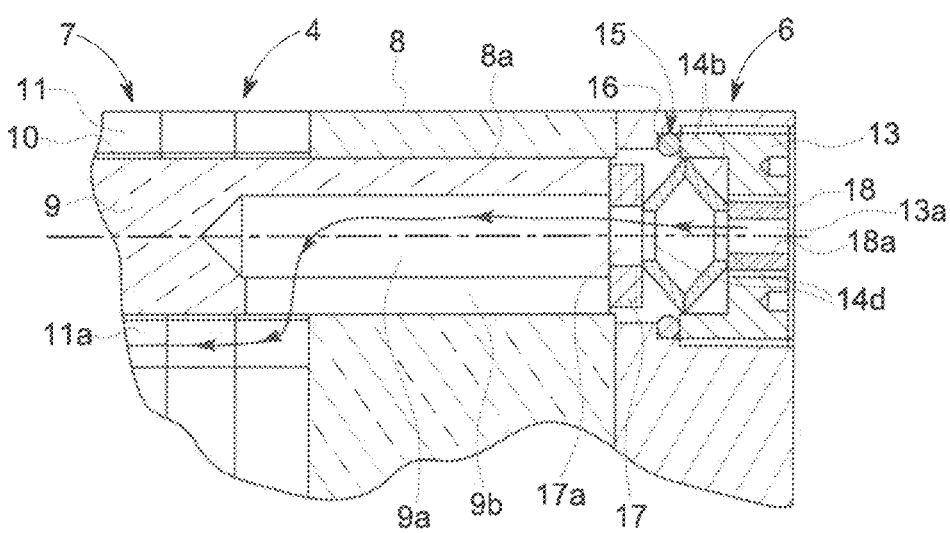
FIG. 8 illustrates a seventh embodiment of the rotor.

FIG. 8 illustrates a partial cross-section of a seventh embodiment of the rotor 4 along the axial direction.

This embodiment differs from the embodiment illustrated in FIG. 7 in that the flexible element comprises two Belleville washers 14b mounted in parallel and each comprising a hole 14d in which the cooling fluid flows.

Figure 9:
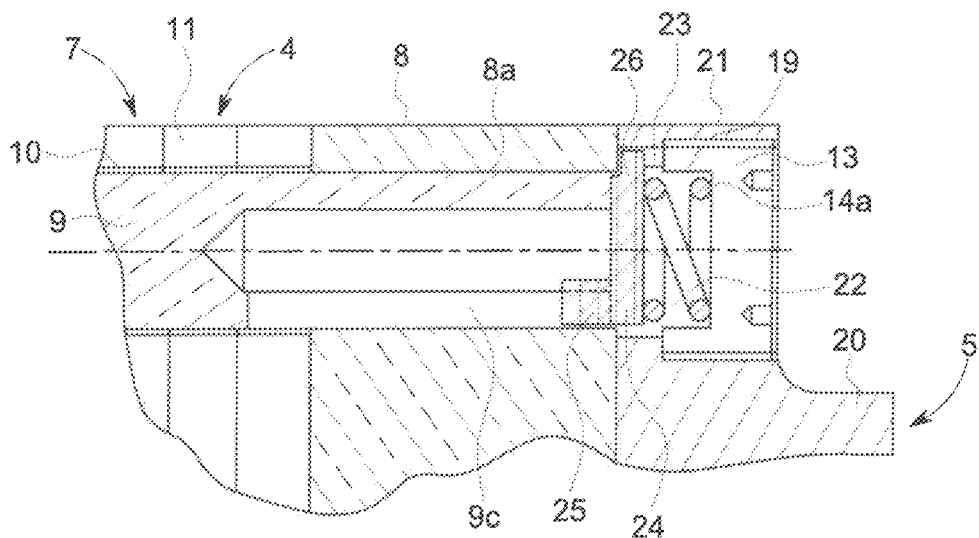
FIG. 9 illustrates a partial cross-section of an eighth embodiment of the rotor along the axial direction.
Figure 10:
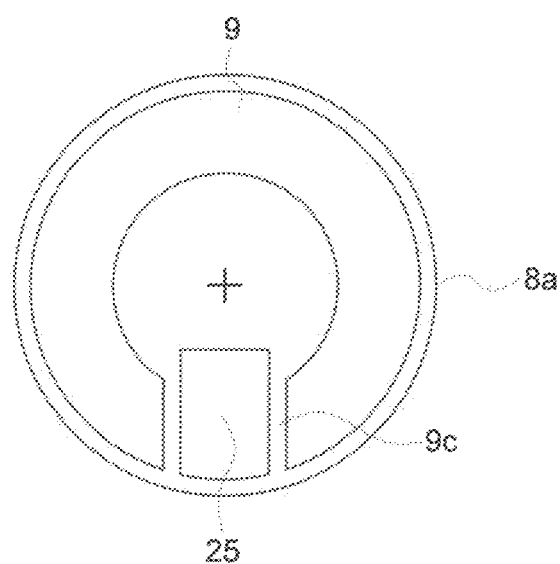
FIG. 10 illustrates a partial view of the eighth embodiment of the rotor of FIG. 9.
Figure 11:
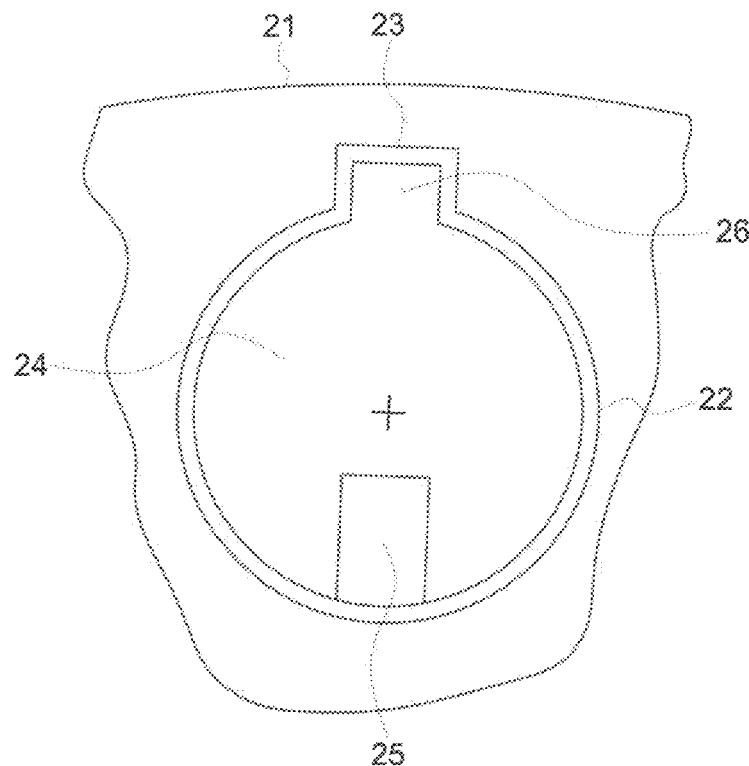
FIG. 11 illustrates another partial view of the eighth embodiment of the rotor of FIG. 9.

FIGS. 9, 10 and 11 illustrate a partial cross-section and partial views of an eighth embodiment of the rotor 4 along the axial direction.

The rotor shaft 5 of the rotor 4 is blind and comprises two half-shafts 20 compacting the magnetic mass 7 comprising the metal plates 11, the half-shafts being connected by tie rods not shown.

The shorting discs 8 are interposed between the magnetic mass 7 and the half-shafts 20.

The compacting element comprises a flange 21 for compacting the half-shaft 20.

The outer diameter of the compacting flange 21 is substantially equal to the outer diameter of the magnetic mass 7 or of the shorting discs 8.

The compacting flange comprises an insertion through-hole 22 with an inner thread, housing the spring 14a and the plug 13.

The end of the conductive bar 9 is hollow and comprises a groove 9c open radially.

Alternatively, the end of the conductive bar 9 is solid and comprises the groove 9c open radially.

The insertion hole 22 comprises a guide groove 23.

The retaining means further comprise a retaining element 24 interposed between the end of the bar 9 and the spring 14a.

Preferably, the retaining element 24 is made from a material for electric insulation.

The retaining element 24 comprises a heel 25 and a tab 26 so that the heel 25 is embedded in the open groove 9c in such a way as to form a shoulder in contact with the end of the bar 9 and the tab 26 slides in the guide groove 23 in such a way as to prevent the rotation of the bar 9 on itself and to maintain the bar 9 along an axial direction.

The retaining element 24 is in one piece.

Alternatively, the heel 25 and/or the tab 26 can be added onto the retaining element 24 by keying or screwing.

Alternatively, the flexible element 14 comprises at least one Belleville washer 14b.

According to another alternative, the retaining element 24 comprises a central through-hole in which the cooling fluid flows.

Figure 12:
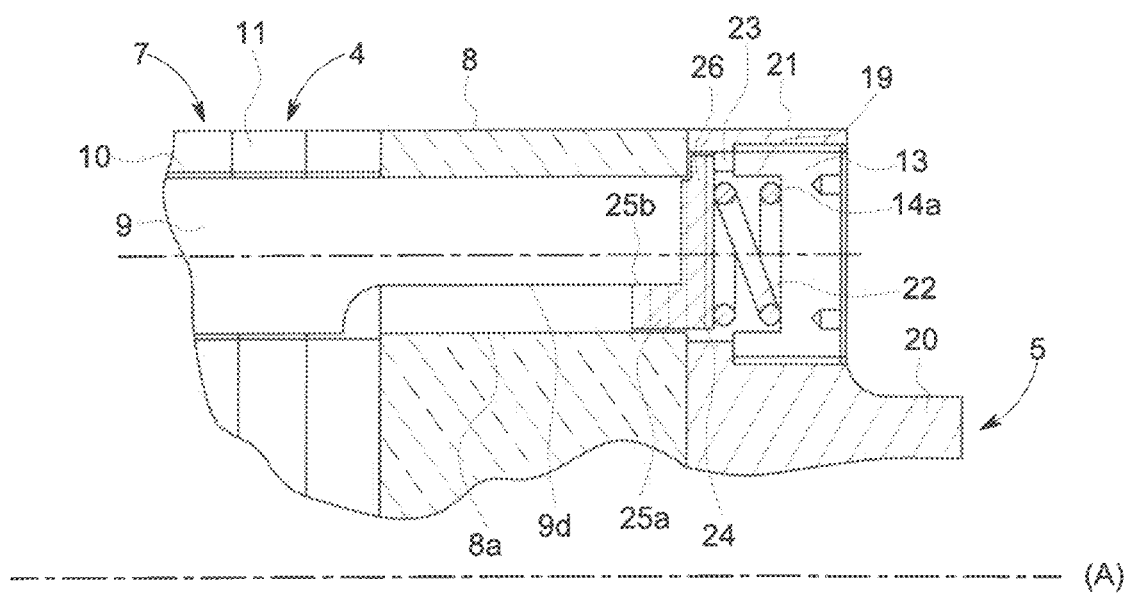
FIG. 12 illustrates a partial cross-section of a ninth embodiment of the rotor along the axial direction.
Figure 13:
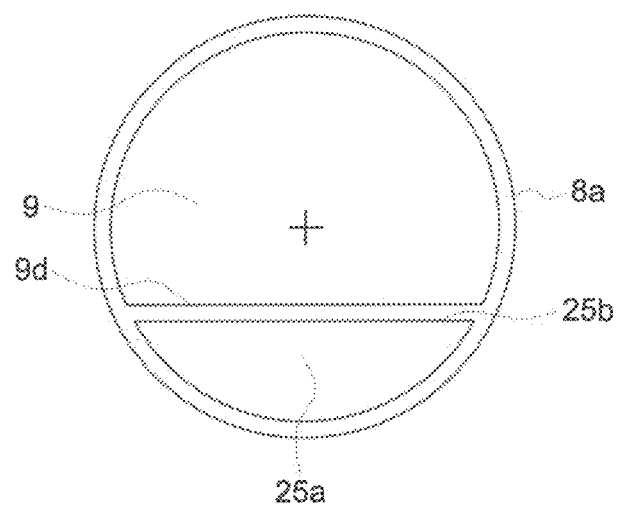
FIG. 13 illustrates a partial view of the ninth embodiment of the rotor of FIG. 12.
Figure 14:
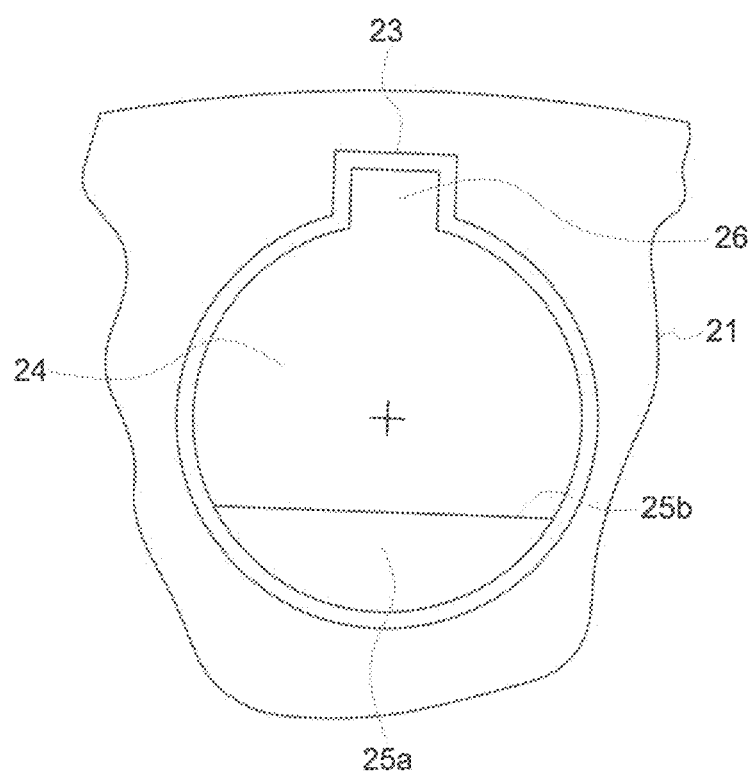
FIG. 14 illustrates another partial view of the ninth embodiment of the rotor of FIG. 12.

FIGS. 12, 13 and 14 illustrate a partial cross-section and partial views of a ninth embodiment of the rotor 4 along the axial direction.

This embodiment differs from the embodiment illustrated in FIGS. 9 to 11 in that the end of the conductive bar 9 comprises a flat section 9d, a heel 25a comprising a flat section 25b coming in contact with the flat section 9d of the bar 9 in such a way as to form a shoulder in contact with the end of the bar and the tab 26 sliding in the guide groove 23 in such a way as to prevent the rotation of the bar 9 on itself and to maintain the bar 9 along the axial direction.

Figure 15:
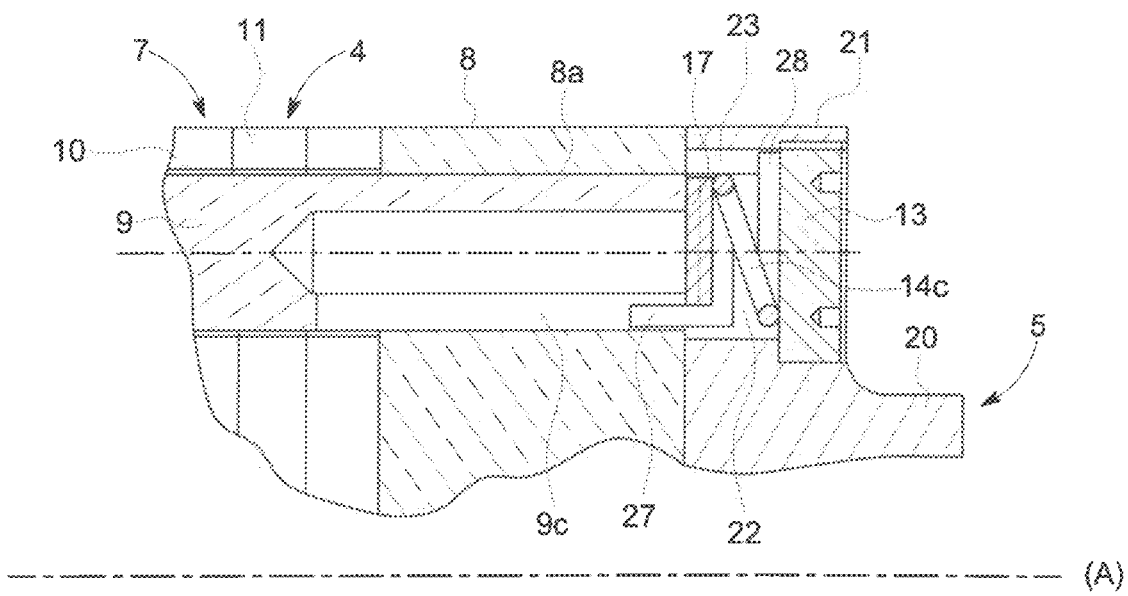
FIG. 15 illustrates a partial cross-section of a tenth embodiment of the rotor along the axial direction.
Figure 16:
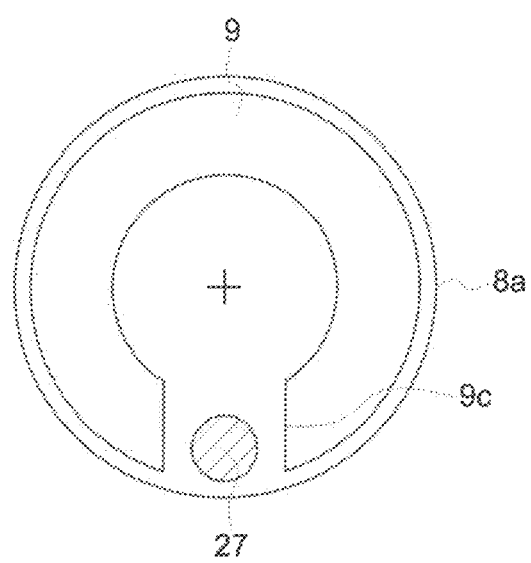
FIG. 16 illustrates a partial view of the ninth embodiment of the rotor of FIG. 15.
Figure 17:
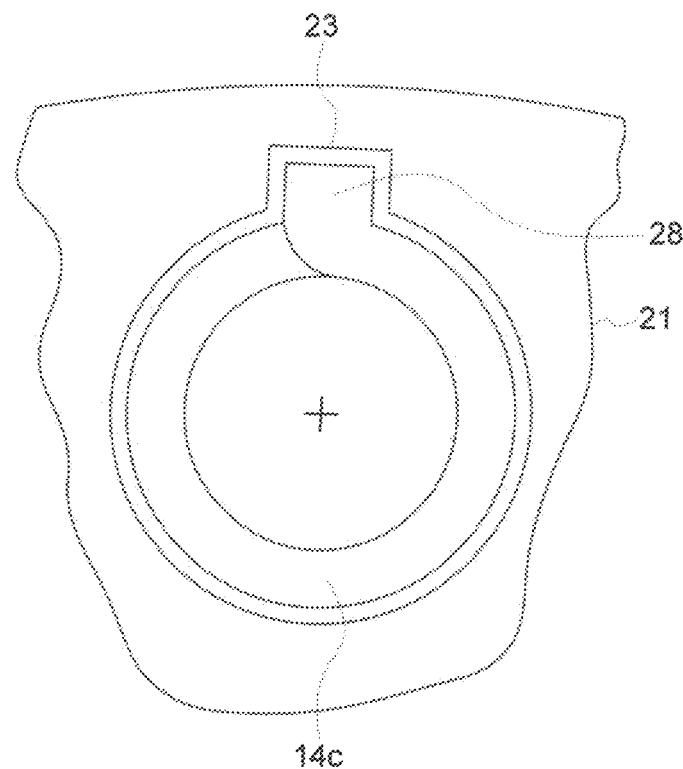
FIG. 17 illustrates another partial view of the tenth embodiment of the rotor of FIG. 15.

FIGS. 15, 16 and 17 illustrate a partial cross-section and partial views of a tenth embodiment of the rotor 4 along the axial direction.

There are the half-shaft 20 comprising the compacting flange 21, the magnetic mass 7 comprising the metal plates 11, the conductive bar 9 hollow at the end and comprising the radially open groove 9c, and the plug 13 not comprising a recess 19.

A spring 14c is interposed between the end of the conductive bar 9 and the plug 13 in such a way that a first end 27 of the spring is embedded in the open groove 9c and the second end 28 of the spring is embedded in the guide groove 23 in such a way as to prevent the rotation of the bar 9 on itself and to maintain the bar 9 along an axial direction.

The insulating element 17 is interposed between the end of the bar 9 and the spring 14c.

Alternatively, the end of the bar 9 and the spring 14c are directly in contact.

Alternatively, the end of the bar 9 is solid and comprises the radially open groove 9c.

In the embodiments of the rotor 4 described above, the conductive bars 9 are distributed uniformly over a diameter of the magnetic mass 7.

According to another embodiment, the conductive bars 9 can be distributed uniformly over several diameters of the magnetic mass 7, at least one end of each conductive bar 9 being maintained by the retaining means.

In the embodiments described above, the retaining means are inserted into insertion holes of at least one compacting element.

Figure 18:
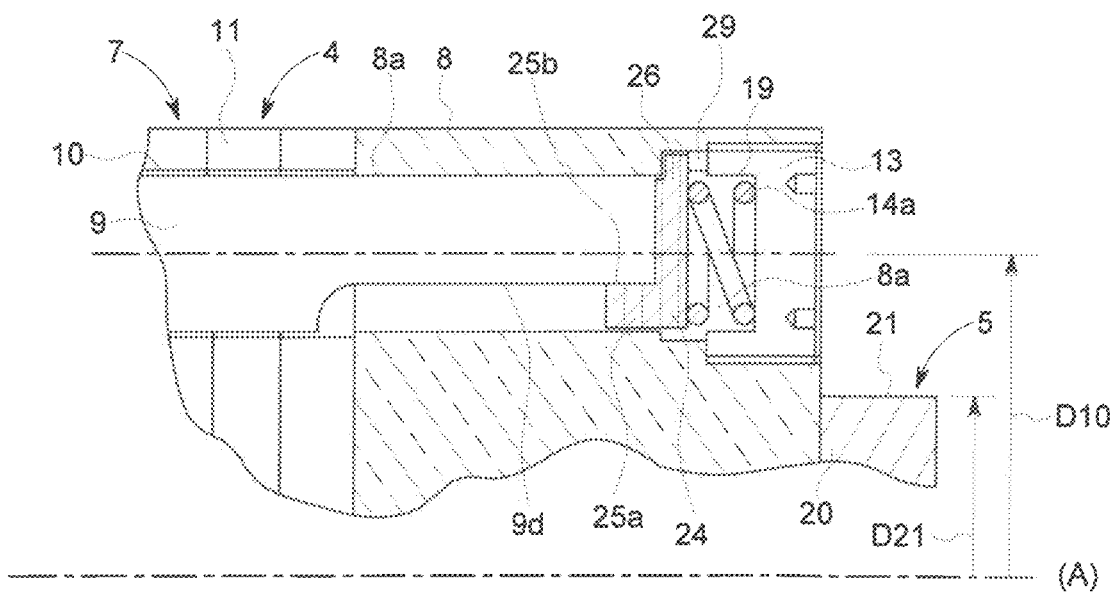
FIG. 18 illustrates an eleventh embodiment of the rotor.

FIG. 18 illustrates a partial cross-section of an eleventh embodiment of the rotor 4 along the axial direction.

This embodiment differs from the embodiment illustrated in FIG. 12 in that the retaining means comprising the plug 13 comprising the recess 19, the spring 14a, the retaining element 24 comprising the heel 25a and comprising the tab 26 are inserted into the insertion hole 8a of the shorting disc 8.

Moreover, the outer diameter D21 of the compacting flange 21 is less than the diameter of implantation D10 of the housings 10 in the magnetic mass 7.

The insertion hole 8a comprises a guide groove 29 in which the tab 26 slides in such a way as to prevent the rotation of the bar 9 on itself.

Of course, the retaining means described in FIGS. 2 to 17 can be inserted into the insertion hole 8a of at least one shorting disc 8.

The retaining means allow to maintain the conductive bars along an axial direction in their housing without significantly reducing the cross-section of passage of the induced current.

Moreover, the retaining means allow to prevent the conductive bars from rotating on themselves in such a way as to obtain a better electric contact between the conductive bars and the shorting discs without significantly reducing the cross-section of passage of the induced currents passing through the conductive bars.

Since the cross-section of the conductive bars 9 is greater, the rotor 4 allows to create rotating electric machines having greater power.

The retaining means allow to retain the conductive bars 9 having a greater cross-section than those of the prior art maintained by screws or pins that run the risk of shearing under the effect of the axial thermal expansion of the conductive bars.

The invention claimed is:

1. A rotor for a squirrel-cage asynchronous rotating electric machine, comprising two compacting elements clamping a cylindrical magnetic mass, shorting discs interposed between the magnetic mass and the compacting elements, and conductive bars housed in housings of the magnetic mass and uniformly distributed over at least one diameter of the magnetic mass so that the shorting discs and the conductive bars form a squirrel cage, at least one of the compacting elements and of the shorting discs comprising insertion holes each disposed facing one of the housings, characterised in that retaining means are inserted into each insertion hole to retain the conductive bars in the housings.

2. The rotor according to claim 1, wherein each insertion hole is blind, the retaining means comprising a flexible element interposed between one end of each conductive bar and the bottom of each blind hole in such a way as to maintain each bar along an axial direction.

3. The rotor according to claim 1, wherein each insertion through-hole comprises an inner thread, the retaining means comprising a plug and a flexible element, the plug being screwed into the inner thread in such a way as to plug the free end of the compacting elements, and the flexible element being interposed between one end of the conductive bars and the plug in such a way as to maintain each bar along an axial direction.

4. The rotor according to claim 3, wherein the plug comprises a recess in which the flexible element is housed.

5. The rotor according to claim 3, wherein each insertion hole further comprises a groove comprising a joint in such a way as to seal the contact between the plug and the compacting elements.

6. The rotor according to claim 3, wherein the plug comprises a hole so that a cooling fluid flows through the retaining means.

7. The rotor according to claim 6, wherein the plug comprises an inner thread receiving a choke calibrating the flow rate of cooling fluid.

8. The rotor according to claim 2, wherein the end of each bar comprises a radially open groove, the insertion holes comprising a guide groove, the retaining means further comprising a retaining element interposed between the end of each bar and the flexible element, the retaining element comprises a heel and a tab, the heel being embedded in the open groove in such a way as to form a shoulder in contact with the end of each bar and the tab sliding in the guide groove in such a way as to prevent the rotation of each bar on itself.

9. The rotor according to claim 2, wherein the end of each bar comprises a flat section, the insertion holes comprising a guide groove, the retaining means further comprising a retaining element interposed between the end of each bar and the flexible element, the retaining element comprising a heel and a tab, the heel comprising a flat section coming in contact with the flat section of each bar in such a way as to form a shoulder in contact with the end of each bar and the tab sliding in the guide groove in such a way as to prevent the rotation of each bar on itself.

10. The rotor according to claim 8, wherein the heel or the tab is added onto the retaining element.

11. The rotor according to claim 2, wherein the flexible element comprises a spring.

12. The rotor according to claim 2, wherein the flexible element comprises at least one Belleville washer.

13. The rotor according to claim 2, wherein the end of each bar comprises a radially open groove, each insertion hole comprising a guide groove, the flexible element comprising a spring, a first end of the spring being embedded in the open groove and the second end of the spring being embedded in the guide groove in such a way as to prevent the rotation of each bar on itself.

14. The rotor according to claim 2, wherein the retaining means further comprise an electrically insulating element disposed between the conductive bars and the flexible element.

15. The rotor according to claim 1, wherein each compacting element comprises a plate for clamping or a flange for compacting a blind half-shaft.

16. The rotor according to claim 1, wherein the magnetic mass comprises compacted magnetic sheets.

17. The rotor according to claim 1, wherein the magnetic mass comprises a stack of metal plates.

18. The rotor according to claim 1, wherein the magnetic mass comprises a one-piece body.

19. A squirrel-cage asynchronous rotating electric machine, comprising the rotor according to claim 1.

* * * * *